US012366345B1

(12) United States Patent
Liu

(10) Patent No.: US 12,366,345 B1
(45) Date of Patent: Jul. 22, 2025

(54) LIGHT FIXTURE WITH MOTOR-DRIVEN SHAPING OF OUTPUT LIGHT

(71) Applicants: Self Electronics Co., Ltd., Zhejiang (CN); Self Electronics USA Corporation, Norcross, GA (US)

(72) Inventor: Xiaoyun Liu, Zhejiang (CN)

(73) Assignees: Self Electronics Co., Ltd., Ningbo (CN); Self Electronics USA Corporation, Norcross, GA (US)

( * ) Notice: Subject to any disclaimer, the term of this patent is extended or adjusted under 35 U.S.C. 154(b) by 0 days.

(21) Appl. No.: 18/915,850

(22) Filed: Oct. 15, 2024

(30) Foreign Application Priority Data

Jun. 27, 2024 (CN) ........................ 202410850659.X

(51) Int. Cl.

| | |
|---|---|
| ***F21V 14/08*** | (2006.01) |
| ***F21V 15/01*** | (2006.01) |
| ***F21V 17/12*** | (2006.01) |
| ***F21V 23/04*** | (2006.01) |
| *F21Y 115/10* | (2016.01) |

(52) U.S. Cl.
CPC .............. *F21V 14/08* (2013.01); *F21V 15/01* (2013.01); *F21V 17/12* (2013.01); *F21V 23/0435* (2013.01); *F21Y 2115/10* (2016.08)

(58) Field of Classification Search
CPC .......... F21V 14/08; F21V 15/01; F21V 17/12; F21V 23/0435
See application file for complete search history.

(56) References Cited

U.S. PATENT DOCUMENTS

| | | | | |
|---|---|---|---|---|
| 3,088,370 | A * | 5/1963 | Erbe | F21V 17/02 359/823 |
| 2011/0222290 | A1 * | 9/2011 | Cavenati | F21V 11/18 362/277 |
| 2021/0263398 | A1 * | 8/2021 | Latteo | G02B 19/0014 |
| 2022/0049839 | A1 * | 2/2022 | Jiang | F21V 17/02 |
| 2023/0152599 | A1 * | 5/2023 | Dalsgaard | G02B 5/005 359/230 |
| 2024/0219009 | A1 * | 7/2024 | Jiang | F21V 21/15 |
| 2025/0067419 | A1 * | 2/2025 | Jurik | F21V 14/08 |

* cited by examiner

*Primary Examiner* — Christopher E Dunay
(74) *Attorney, Agent, or Firm* — Wang Law Firm, Inc.

(57) ABSTRACT

A light fixture has a lamp housing with a light outlet, and a light source assembly arranged in the lamp housing, and a light-shaping module arranged in the light source assembly along the output direction of the light for shaping the pattern or shape projected by the light fixture. The light fixture with motor-driven shaping of output light of the present invention controls the movement of each shading blade by driving motors to precisely adjust their positions thereby precisely defining the shape of the shading opening. Precision of the shape, size and position of the light spot can be improved and the illuminating effect can be enhanced.

10 Claims, 5 Drawing Sheets

LIGHT FIXTURE WITH MOTOR-DRIVEN SHAPING OF OUTPUT LIGHT

RELATED APPLICATION

This present application claims priority of Chinese patent application no. CN 202410850659.X filed on Jun. 27, 2024, the disclosures of which are incorporated herein by reference in its entirety.

FIELD OF THE TECHNOLOGY

The present invention relates to the technical field of light fixtures, and in particular to a light fixture with motor-driven shaping of output light.

BACKGROUND

In order to better display and illuminate art galleries and museum paintings, and to accurately regulate the illuminating range of paintings, people will use light fixtures with adjustable light spot shaping using light blocking or light shaping members to form a specific light spot to illuminate. Such products are widely used in the existing cultural and museum market, and have become necessary light fixtures in some high-end and famous painting exhibition lighting solutions.

Such existing light fixtures usually adopt a manual adjustment of the position of the shading blades to partially intercept emitted light and properly adjust the shape of the light spot. But for such manually operated adjustable light fixtures, because the personnel need to work at high altitude, there is a potential safety hazard. Moreover, in the process of adjusting the shading blades, an accurate position often cannot be realized by manual adjustment. Because the size difference between the adjusted dimension of the shading blades and the actual size of the light spot can be dozens of times, when there is a slight deviation in the position of any shading blade, the light spot will be deviated significantly, which will be perceived by customers. And the manual operation is time-consuming and inconvenient, and the inaccuracy of the light spot also affects the effect of illumination on exhibits.

Accordingly, those skilled in the art endeavor to develop an adjustable light fixture including a mechanism for shaping the output light that is can be automatically adjusted using shading blades to precisely adjust the light spot.

BRIEF SUMMARY THE TECHNOLOGY

In view of this, the technical problem to be solved by the present invention is to overcome the inconvenience and poor accuracy caused by manually adjustment of the shading blades in conventional light fixtures with an adjustment mechanism for shaping output light.

In order to achieve the above objects, the present invention provides a light fixture with motor-driven shaping of output light, comprising a lamp housing provided with a light outlet and a light source assembly arranged in the lamp housing, wherein a light-shaping module is arranged in the light source assembly along the output direction of the light for shaping the pattern or shape of light projected by the light fixture. The light-shaping module comprises a plurality of shading blades, a blade holder, driving motors and a driving board, wherein the blade holder is disposed between the plurality of shading blades and the driving motors, a first aperture is formed in the middle of the blade holder, and the plurality of shading blades is movably supported on the blade holder and disposed to form together a shading opening, and the driving board is electrically connected to the driving motors. For each driving motor and the corresponding shading blade, the output end of the driving motor comprises a driving rod and a linkage block connected to the driving rod, the driving motor is connected to the corresponding shading blade by means of the linkage block, the end face of the linkage block is provided with a transmission column extending toward the corresponding shading blade, the shading blade is provided with a groove for the transmission column to pass through, and a first guide groove is provided on the blade holder for the transmission column to move.

According to a further embodiment, two grooves are provided on each of the shading blades, each of which is drivably connected with a corresponding driving motor to enable a movement of translation and/or rotation of the corresponding shading blade.

According to a further embodiment, the driving motors are stepper motors, and two driving motors are configured corresponding to one shading blade with the output shafts of the driving motors extending in the same direction.

According to a further embodiment, the first guide groove is configured in a straight shape or an arc shape, and the linkage block and the driving rod are movably or fixedly connected.

According to a further embodiment, the transmission column is configured with a circular cross-section and the grooves are configured circular, oval or strip-shaped.

According to a further embodiment, the end edges of the shading blades are sequentially overlapped, and each shading blade comprises an upper lap edge and a lower lap edge, and the lower lap edge and the upper lap edge of any one of the shading blades being overlapped respectively with the upper lap edge and the lower lap edge of two adjacent shading blades.

According to a further embodiment, four shading blades are movably supported on the blade holder and disposed sequentially circumferentially around the shading opening.

According to a further embodiment, the shading blades are covered with a slide plate, and the shading blades are sandwiched between the slide plate and the blade holder, wherein the slide plate is provided with a second aperture in the middle and with a second guide groove which is matched with the shape of the first guide groove, the slide plate and blade holder are fixedly connected in parallel, and the end of the transmission column passes through the slide plate so that it can be moved along the second guide groove.

According to a further embodiment, the driving motors are fixedly mounted on a motor holder, the blade holder and the motor holder are fixedly connected, a through hole is formed in the middle of the motor holder, the light source assembly is coaxially arranged with the first aperture of the blade holder and the light output end of the light source assembly is fixedly mounted inside the through hole.

According to a further embodiment, the light fixture further comprises a lens module, which is fixedly connected outside the light-shaping module along the light output direction by a lens holder, comprising a lens barrel, wherein a face cover is mounted at the end of the lamp housing and the middle of the face cover is provided with an opening for the lens barrel to pass through, and the lens holder is accommodated in the lamp housing after the face cover and the lamp housing are assembled.

According to a further embodiment, the lamp housing is provided with a signal receiving module for receiving a wireless control signal, and the signal receiving module is electrically connected to the driving board.

TECHNICAL EFFECTS OF THE INVENTION

The light fixture with motor-driven shaping of output light of the present invention enables a precise and cost-effective control of the movement of each shading blade inside the light fixture by means of driving motors associated to corresponding light shaping blades to precisely adjust their position and form an adjustable light shading opening (aperture). According to the present invention the precision of the shape, size and position of a light spot can be enhanced significantly and accordingly the effect of illuminating of paintings and other objects can be enhance in a cost-effective manner. Moreover, a light fixture according to the present invention is also suitable for remote control, providing convenience in operation.

BRIEF DESCRIPTION OF THE DRAWINGS

Embodiments of the present invention will be described below with reference to the drawings, in which.

DETAILED DESCRIPTION OF THE INVENTION

Specific embodiments of the present invention will be described in further detail below based on the drawings. It should be understood that the description of the embodiments of the present invention herein is not intended to limit the protection scope of the present invention.

Figure 1:
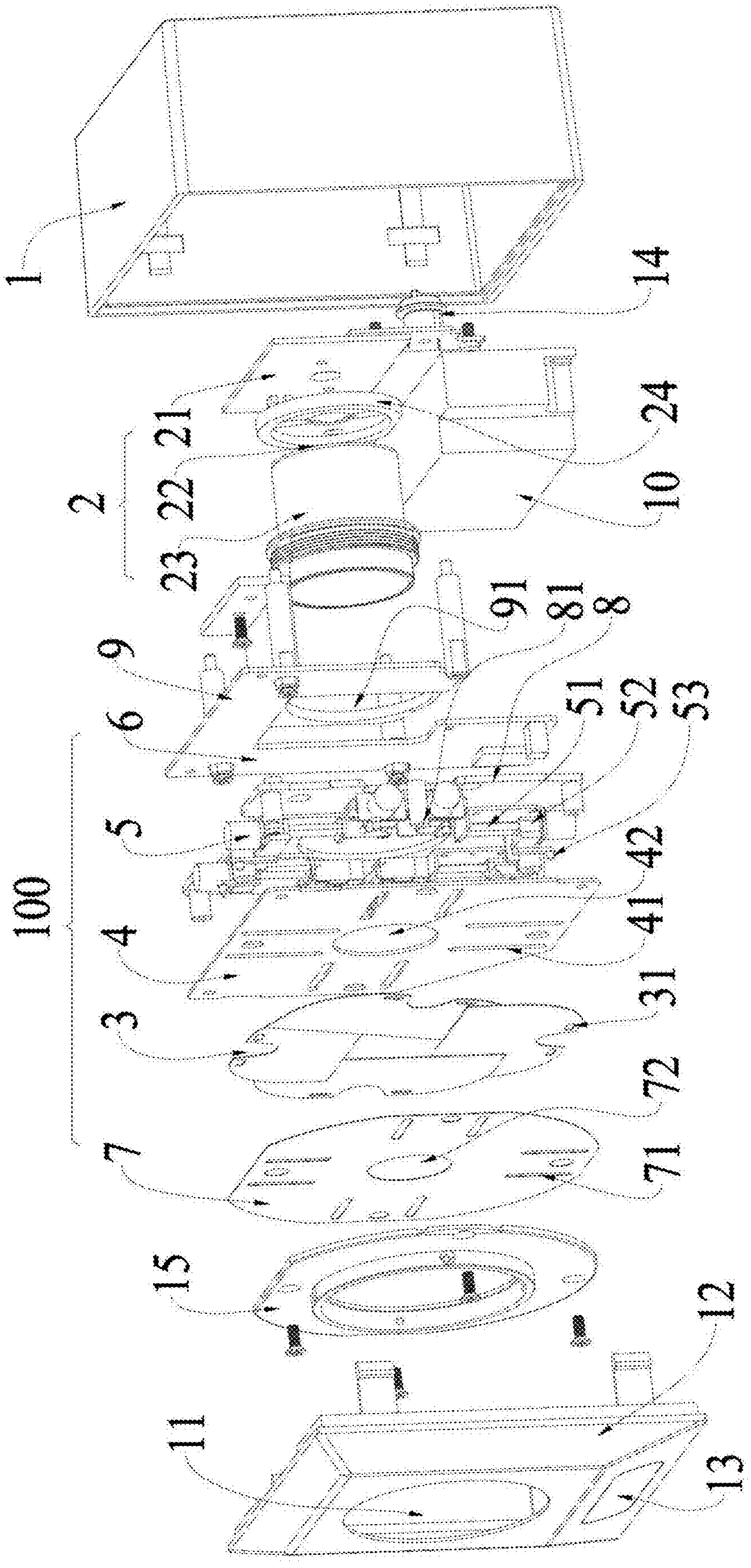
FIG. 1 is a schematic exploded diagram of a light fixture with motor-driven shaping of output light according to the present invention.
Figure 2:
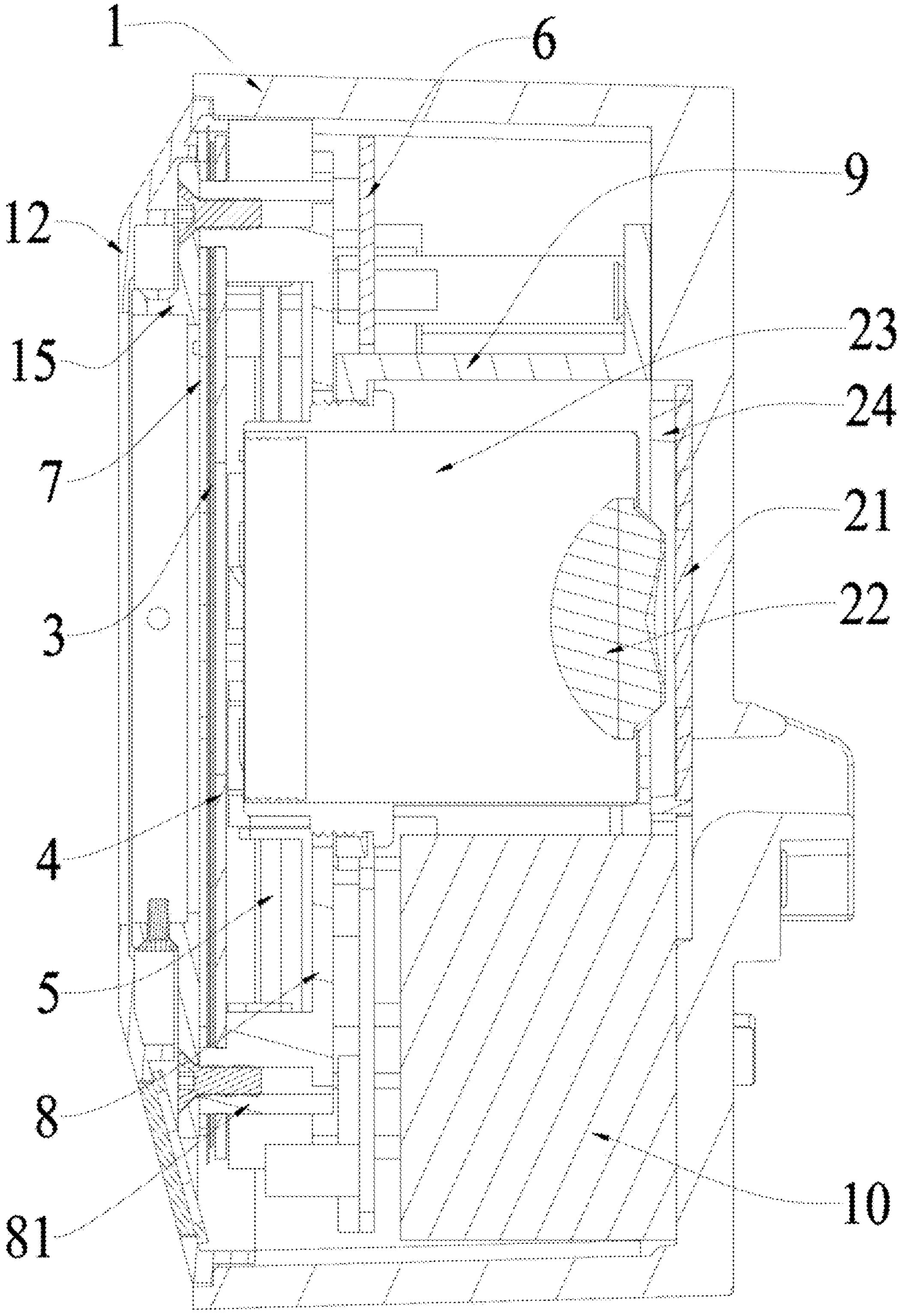
FIG. 2 is a structural schematic diagram of a light fixture with motor-driven shaping of output light motor-driven the present invention in a cross-sectional view.

A light fixture with motor-driven shaping of output light provided by the present invention is shown in FIGS. 1 and 2. The light fixture comprises a lamp housing 1 provided with a light outlet 11, a light source assembly 2 disposed inside the lamp housing 1, and a light-shaping module 100 arranged in the light source assembly 2 along the output direction of the light for shaping the projected light pattern, in particular light spot, by shading using shading members that partially block light emitted by the light source assembly 2. The light-shaping module 100 comprises a plurality of shading blades 3, a blade holder 4, a plurality of driving motors 5 and a driving board 6, in particular a printed circuit board including a controller, electrically connected to the driving motors 5. The blade holder 4 is disposed between the shading blades 3 and the driving motors 5. A first aperture 42 is formed in the middle of the blade holder 4 by the plurality of shading blades 3. And the shading blades 3 are movably supported on the blade holder 4 in a distributed arrangement and together surround the light beam emitted by the light source assembly 2 to form a shading opening, in particular an aperture, for shaping the light beam emitted by the light source assembly by partially blocking the emitted light. The driving board 6 is electrically connected to the driving motors 5, and the driving board 6 comprises a control circuit to drive the driving motors 5 for adjustment of the positions of the light shading blades 3. The output end of each driving motor 5 comprises a driving rod 51 and a linkage block 52 connected to the driving rod 51. Each driving motor 5 is connected to an associated shading blade 3 by means of the linkage block 52, so that movement of the linkage block 52 drives a corresponding displacement of the associated shading blade 3 for shaping the emitted light during operation of the driving motors 5 under the control of the driving board 6. In this manner, the linkage blocks 52 connected to the associated shading blade 3 drive the shading blades 3 adjustment of their positions to achieve a shaping the emitted light.

Furthermore, the end face of each linkage block 52 is provided with a transmission column 53 extending toward the associated shading blade 3. The transmission column 53 has a certain extension length. Each shading blade 3 is provided with a groove 31 for the transmission column 53 to pass through, and a plurality of first guide grooves 41 is provided on the blade holder 4 for guiding the respective transmission column 53 to move. When a respective linkage block 52 is moved or displaced, the first guide groove 41 works for limiting and guiding the movement of the associated transmission column 53, so that the displacement control of the drive motors 5 to the shading blades 3 is accurate and controllable.

In a preferred embodiment of the present invention, two grooves 31 are provided on each shading blade 3. And each groove 31 of a shading blade 3 is drivably connected to a corresponding driving motor 5. By selectively driving the two driving motors 5 of a shading blade 3, the corresponding two transmission columns 53 are controlled so that they can be moved e.g. forward at the same time, or move backward at the same time, or moved at different speeds. When the two sides of the transmission columns 53 of a shading blade 3 are controlled to move at different speeds, the transmission columns 53 are driven relative to each other at different speeds to move forward or backward on a single side, so that the shading blade 3 appears to rotate relative to one of the transmission columns 53. Thus, by means of the selectively driving the two driving motors 5 of a shading blade 3, a movement of translation or rotation or a combination thereof can be achieved for the shading blade 3. Preferably, the shading blade 3 and the corresponding two driving motors 5 are symmetrically arranged.

Preferably, the driving motors 5 are stepper motors. And preferably two driving motors 5 are provided corresponding to each shading blade 3, wherein the output shafts of the respective pair of driving motors 2 preferably extend in the same direction. The driving rod 51 of a driving motor 5 is preferably a lead screw, in which case the linkage block 52 and the driving rod 51 are threaded. The linkage blocks 52 abut against the bottom side of the blade holder 4 and the transmission columns 53 passes through the first guide groove 41. When a drive motor 5 is actuated, the rotary motion of the output shaft is thus converted into linear motion, so that the linkage block 52 performs a precise axial movement along the driving rod 51. The first guide groove 41 is correspondingly set as a straight shape type to cooperate with the corresponding linkage block 52 to precisely guide its movement and displacement.

As an alternative to the above-mentioned driving operation mode, the driving motors 5 may also be push rod motors. In such embodiments, the driving rods 51 may be telescopic rods. There may be a movable connection or a fixed connection between the linkage block 52 and the driving rod 51. When the linkage block 52 and the driving rod 51 are relatively fixed, the linkage block 52 moves axially. The first guide groove 41 is correspondingly configured as a straight shape type for guiding the movement (displacement) of the associated telescopic rod. The linkage block 52 may also be movably connected to the driving rod 51, and the first guide groove 41 may be configured as an arc shape to cause the shading blade 3 to move along an arc-shaped trajectory for adjustment of the position and orientation of the associated shading blade 3. Obviously, in the present implementation structure of the present invention, it can be easier to control when moving in a straight line trajectory.

Figure 3:
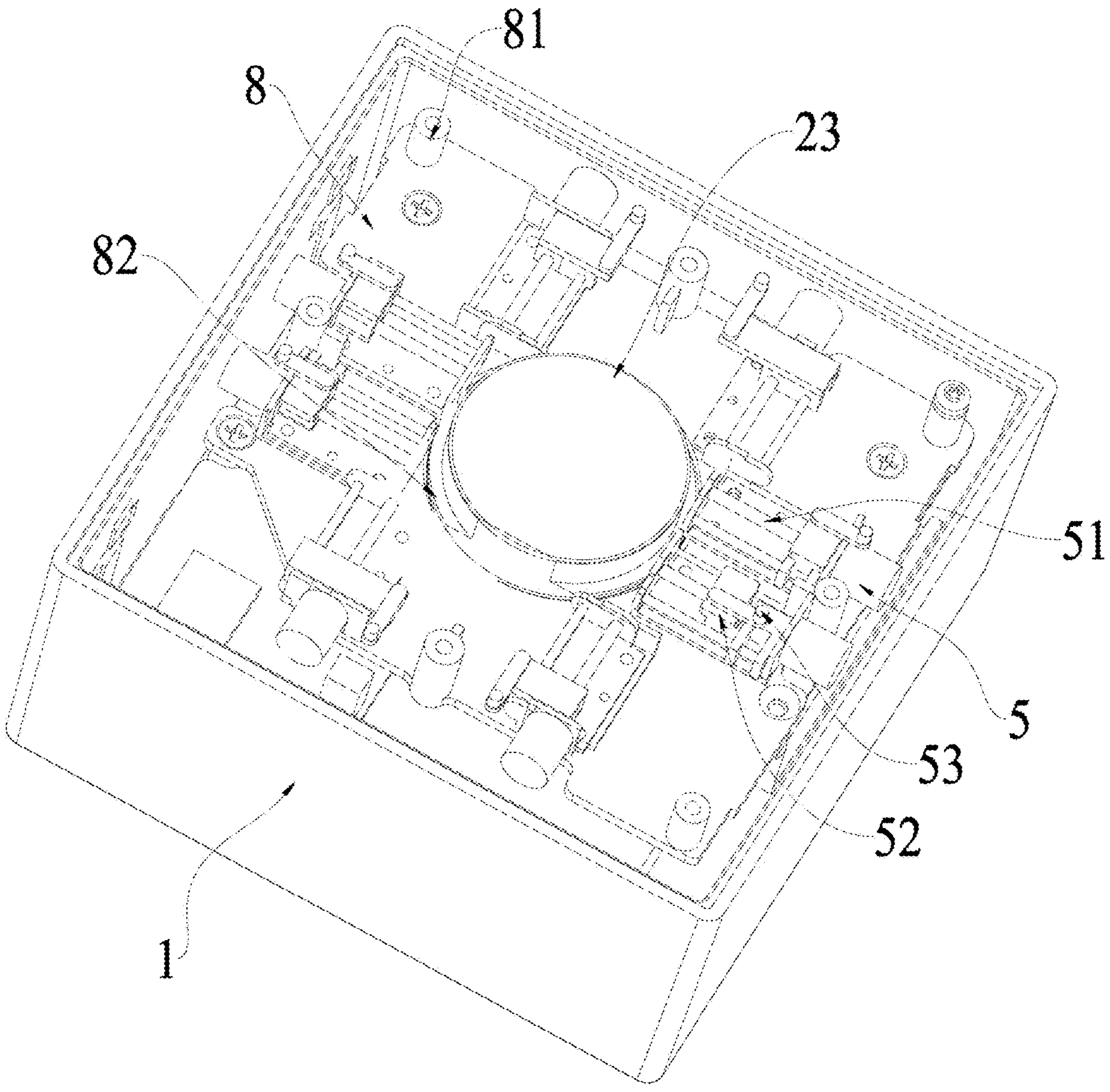
FIG. 3 is a structural schematic diagram of the driving motors of a light fixture with motor-driven shaping of output light motor-driven the present invention.

The transmission column 53 may be embedded in the groove 31 and configured to drive the movement of the associated shading blade 3. In the embodiment shown in FIG. 3, the cross-section of the transmission column 53 is circular and the associated groove 31 is oval-shaped. In other embodiments, the groove 31 may be circular, oval-shaped or of an elongated shape such as strip-shaped. When, for example, the groove 31 is elongated, the movement path of the associated transmission column 53 inside the groove 31 is additionally increased, thereby increasing the rotation amplitude of the shading blade 3.

When the light emitted by the light source assembly 2 passes through the first aperture 42 together formed by the plurality of shading blades 3 on the blade holder 4, it will be shaped as a columnar beam, and when passing through the shading blades 3, the shading blades 3 partially block the light. More specifically, when the light passes through the shading opening (aperture) enclosed by the inner sides of the plurality of shading blades 3, a light spot is formed having a shape corresponding to the shape of the shading opening (aperture) together formed by the plurality of shading blades 3.

In contrast, according to the prior art, when there are multiple translational shading blades arranged, each shading blade translates independently. When a smaller shading opening is needed, in order to avoid conflicts when shading blades move, often they are distributed in several motion planes and move respectively. This will inevitably increase the thickness of the shading opening. For practical applications, when a light spot is to be shaped that is magnified several times after the initial small-sized light beam leaves the light fixture, problems such as defocusing and blurred edges are prone to occur.

Figure 4:
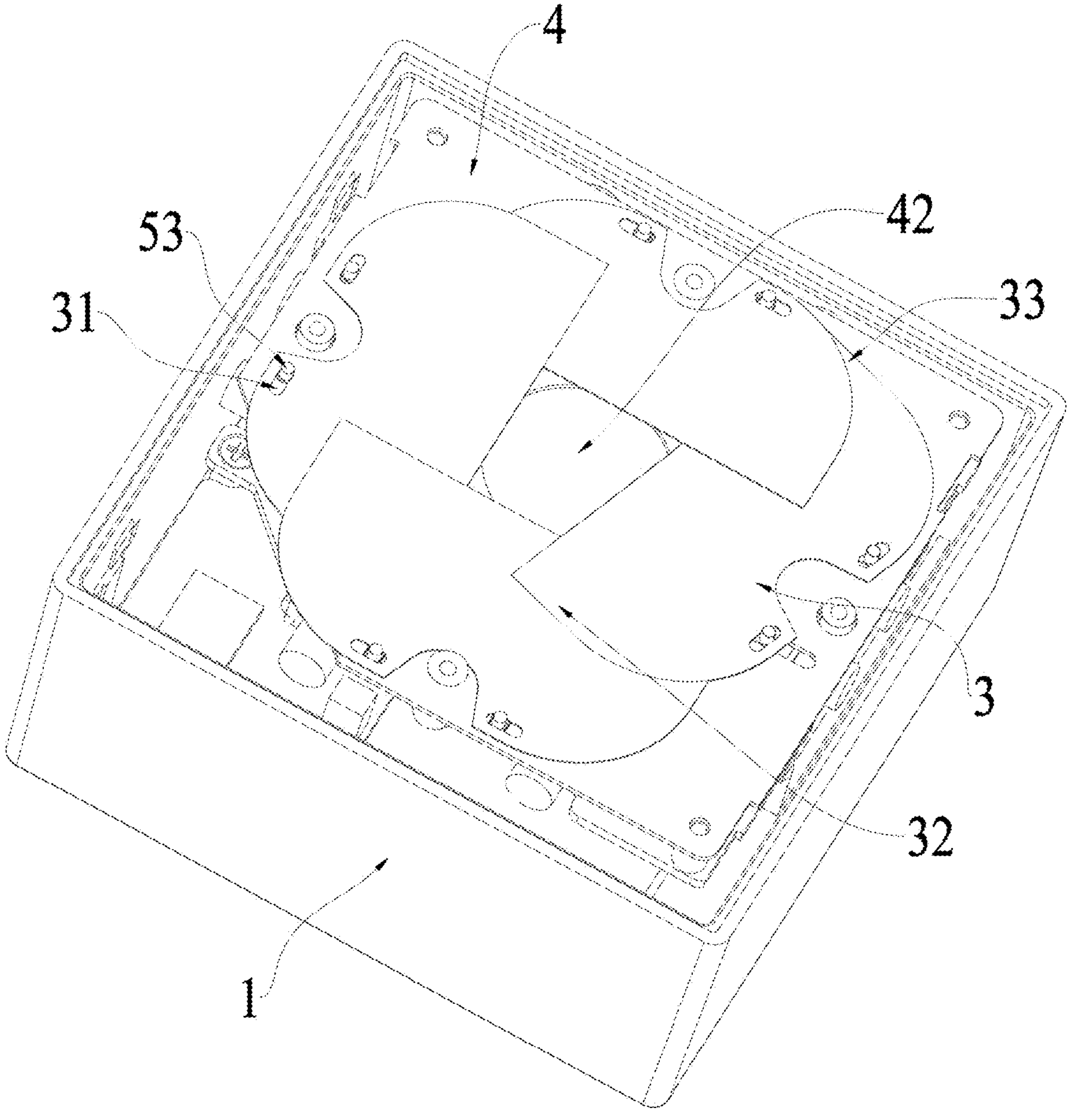
FIG. 4 is a structural schematic diagram of the shading blades of a light fixture with motor-driven shaping of output light motor-driven the present invention.

In contrast, in a light fixture with motor-driven shaping of output light according to the present invention the end edges of the shading blades 3 are sequentially overlapped, and in particular abut each other. Each shading blade 3 comprises an upper lap edge 32 and a lower lap edge 33, and the lower lap edge 33 and the upper lap edge 32 of any one of the shading blades 3 is overlapped respectively with the upper lap edge 32 and the lower lap edge 33 of two adjacent shading blades 3. In the embodiment shown FIG. 4, there are four shading blades 3 and these are disposed sequentially circumferentially around the shading opening. In the embodiment shown in FIG. 4, a total of eight driving motors 5 are arranged to drive the movement of the four shading blades 3. According to this arrangement, the inner side edges of the shading blades 3 are disposed close to each other and within a relatively thin planar layer, which improves the imaging accuracy of the light spot after light beam shaping. Overall, the structure of the light-shaping module 100 according to the present invention is significantly simplified as compared to the prior art, and the volume of the light fixture can be reduced significantly as well.

The shading blades 3 may be covered with a slide plate 7, so that the shading blades 3 are then sandwiched between the slide plate 7 and the blade holder 4. The slide plate 7 may be provided with a second aperture 72 in the middle. In particular, the size of the second aperture 72 may be set to be larger than the maximum adjustable diameter of the shading opening in use to ensure that the intercepted light spot is not blocked. The slide plate 7 may be provided with a second guide groove 71 which is matched with the shape of the first guide groove 41. The slide plate 7 and blade holder 4 may be fixedly connected in parallel, so that the axial projection of the second guide groove 71 on the blade holder 4 coincides with the first guide groove 41. In such an embodiment, the end of the transmission column 53 passes through the slide plate 7 and can move along the track defined by the first guide groove 41 and the second guide groove 71. Each shading blade 3 is thus constrained to move in the space between the slide plate 7 and the blade holder 4, thereby maintaining a stable light intercepting plane and making the light spot imaging stable.

The driving motors 5 are fixedly mounted on a motor holder 8, and the linkage block 52 is movably attached to the bottom side of the blade holder 4. The motor holder 8 may be provided with a connecting column 81. The blade holder 4 and the motor holder 8 are fixedly connected, so that the connecting column 81 abuts between them and precisely defines the installation height of the driving motors 5. A through hole 82 may be formed in the middle of the motor holder 8, so that the light source assembly 2 is coaxially arranged with the first aperture 42 of the blade holder 4 and the light output by the light source assembly 2 passes through the through hole 82 from bottom to top. In a further embodiment of the present invention, the light output end of the light source assembly 2 is fixedly mounted inside the through hole 82. The driving board 6 may fixedly installed on the bottom side of the motor holder 8. In addition, a bracket 9 may be installed between the motor holder 8 and the bottom side of the lamp housing 1. The power module 10 may be fixedly installed on the lower side of the bracket 9. A circuit board including the driving board 6 may be optionally placed flat and fixed on the bracket 9. An installation hole 91 may be formed as e.g. a recess in the bracket 9 for fixedly installing the light source assembly 2. Preferably, the periphery of the light source assembly 2 and the inner wall of the installation hole 91 are fixedly connected by threads. The light source assembly 2 may include a LED module 21, a fixed lens 22 and a light source cylinder 23 assembled in sequence. The LED module 21 and the light source cylinder 23 are assembled and connected through an annular base 24. The fixed lens 22 is arranged at the bottom end of the light source cylinder 23 and close to the LED module 21. The top end of the light source cylinder 23 passes through the bracket 9 and the motor holder 8 and the light source cylinder 23 is fixed with the inner side of the installation hole 91.

Figure 5:
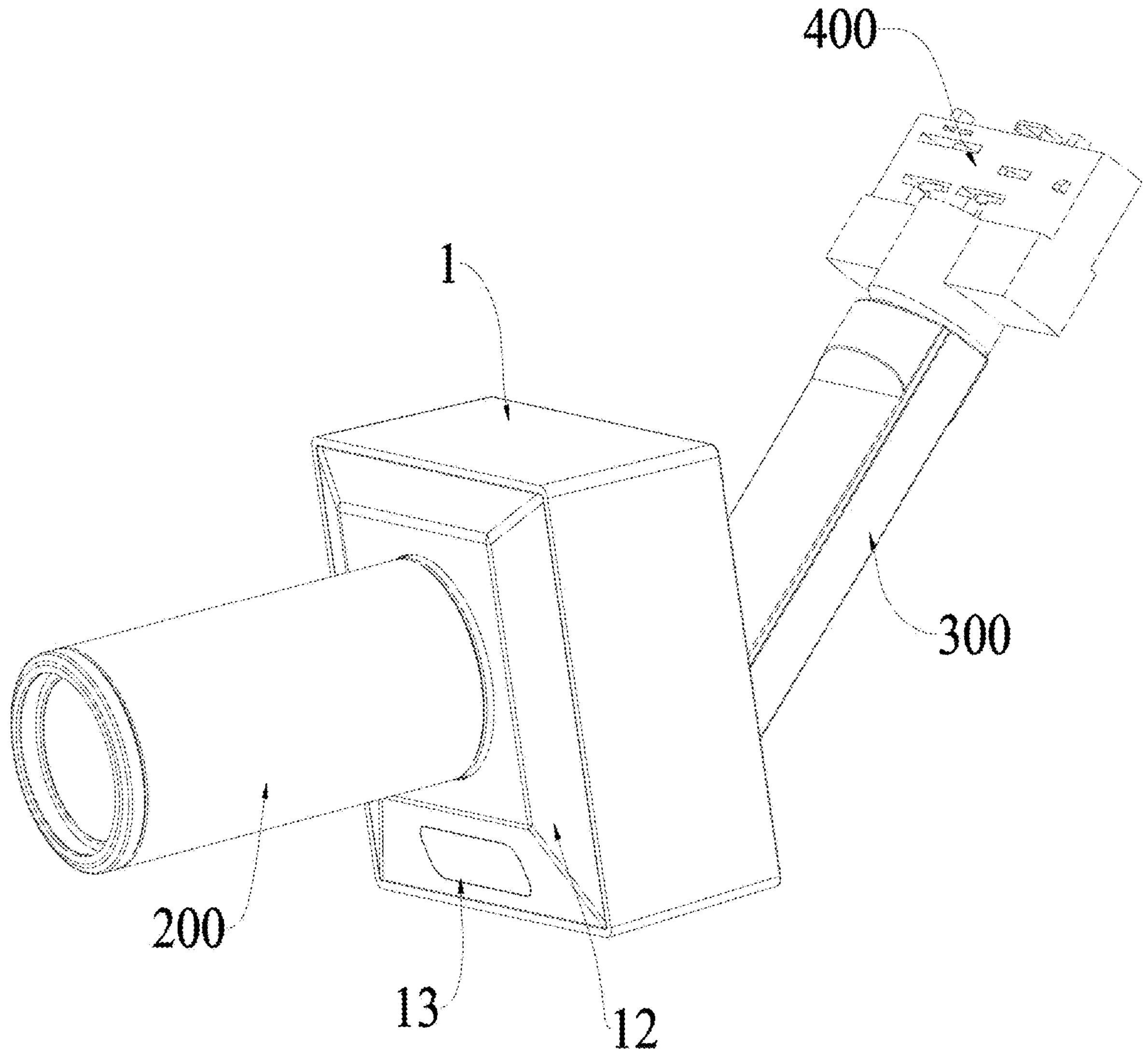
FIG. 5 is a schematic view of an embodiment of a light fixture with motor-driven shaping of output light according to the present invention in an assembled state and in actual use.

In a preferred embodiment of the present invention, as shown in FIG. 5, outside the lamp housing 1 a lens module 200, which comprising a lens barrel, is fixedly connected outside the light-shaping module 100 along the light output direction by a lens holder 15. A face cover 12 is mounted at the end of the lamp housing 1, and the middle of the face cover 12 is provided with an opening for the lens barrel to pass through, and the lens holder 15 is accommodated in the lamp housing 1 after the face cover 12 and the lamp housing 1 are assembled. The optical axis of the lens module 200 and the light source are coaxially arranged. It is used for flexible focusing and shaping a light spot according to the distance between the position to be illuminated and the light fixture. The irradiation distance can be freely adjusted and the irradiation range can be wider according to the present invention. The lens module 200 can be chosen from any structure known in the prior art in the field such as a focusing lamp barrel. It is well known to those skilled in the art and will not be specifically elaborated here.

In the light fixture with motor-driven shaping of output light according to the present invention, the lens holder 15, the slide plate 7, the blade holder 4, and the motor holder 8 are sequentially passed through and fixedly connected by fixing members. The fixing members may be screws. After installation, the slide plate 7 and the blade holder 4 clamp the shading blades 3 so that each shading blade 3 tends to be constrained in one plane. For the slide plate 7, a material that is wear-resistant and provides a good elasticity can be selected. For example, a stainless steel sheet may be selected as material for the slide plate 7. After installation, the slide plate 7 elastically presses against the shading blades 3 to prevent local warping of the shading blades 3 during use. In addition, an elastic member may be added between the lens holder 15 and the slide plate 7 so that the slide plate 7 can keep pressing against the shading blades 3.

Preferably, the lamp housing 1 is provided with a signal receiving module for receiving wireless control signal. Such a signal receiving module is electrically connected to the driving board 6 and can be selected for communication through Bluetooth, infrared, WiFi, ZigBee, 4G, 5G, etc. The user can then remotely control the driving motors 5 of the light fixture for light spot adjustment. A handheld remote controller may be used to control each shading blade 3 in the light fixture for light spot adjustment. In one embodiment, there is a light-transmitting opening 13 outside the lamp housing 1, which can accept laser light to go through to control. In another embodiment, a DIP switch module 14 can also be provided on the back side of the lamp housing 1. The DIP switch module 14 is electrically connected to the driving board 6. Before the light fixture is in operation, the DIP switch may be operated to adjust the lighting parameters.

The light fixture with motor-driven shaping of output light according to the present invention may be used as a ceiling light as shown in FIG. 5, wherein a rotating arm 300 and an electric head 400 are sequentially connected outside the lamp housing 1. The two ends of the rotating arm 300 are rotatably connected to the lamp housing 1 and the electric head 400 respectively. The inside of the rotating arm 300 is penetrated by a power supply wire. The electric head 400 is used to connect to a power supply track (not shown). Such a light fixture with motor-driven shaping of output light according to the present invention can be used to adjust the light-emitting angle of the light fixture by means of the rotating arm 300 and to adjust the shape and size of the light spot, so that it can eventually meet the illuminating needs of various exhibits.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. A light fixture with motor-driven shaping of output light, comprising a lamp housing (1) provided with a light outlet (11) and a light source assembly (2) arranged in the lamp housing (1), wherein a light-shaping module (100) is arranged in the light source assembly (2) along the output direction of the light for shaping the pattern or shape of light projected by the light fixture, wherein the light-shaping module (100) comprises a plurality of shading blades (3), a blade holder (4), driving motors (5) and a driving board (6), wherein the blade holder (4) is disposed between the plurality of shading blades (3) and the driving motors (5), a first aperture (42) is formed in the middle of the blade holder (4), and the plurality of shading blades (3) is movably supported on the blade holder (4) and disposed to form together a shading opening, and the driving board (6) is electrically connected to the driving motors (5), wherein, for each driving motor (5) and the corresponding shading blade (3), the output end of the driving motor (5) comprises a driving rod (51) and a linkage block (52) connected to the driving rod (51), the driving motor (5) is connected to the corresponding shading blade (3) by means of the linkage block (52), the end face of the linkage block (52) is provided with a transmission column (53) extending toward the corresponding shading blade (3), the shading blade (3) is provided with a groove (31) for the transmission column (53) to pass through, and a first guide groove (41) is provided on the blade holder (4) for the transmission column (53) to move characterized in that the end edges of the shading blades (3) are sequentially overlapped, and each shading blade (3) comprises an upper lap edge (32) and a lower lap edge (33), and the lower lap edge (33) and the upper lap edge (32) of any one of the shading blades (3) being overlapped respectively with the upper lap edge (32) and the lower lap edge (33) of two adjacent shading blades (3).

2. The light fixture with motor-driven shaping of output light as claimed in claim 1, wherein the groove (31) on any of the shading blades (3) comprises two grooves (31), each of which is drivably connected with a corresponding driving motor (5) to enable a movement of translation and/or rotation of the corresponding shading blade (3).

3. The light fixture with motor-driven shaping of output light as claimed in claim 2, wherein the driving motors (5) are stepper motors, and two driving motors (5) are configured corresponding to one shading blade (3) with the output shafts of the driving motors (5) extending in the same direction.

4. The light fixture with motor-driven shaping of output light as claimed in claim 1, wherein the first guide groove (41) is configured in a straight shape or an arc shape, and the linkage block (52) and the driving rod (51) are movably or fixedly connected.

5. The light fixture with motor-driven shaping of output light as claimed in claim 1, wherein the transmission column (53) is configured with a circular cross-section and the grooves (31) are configured circular, oval or strip-shaped.

6. The light fixture with motor-driven shaping of output light as claimed in claim 1, wherein the shading blades (3) comprises four shading blades (3), and the four shading blades (3) are movably supported on the blade holder (4) and disposed sequentially circumferentially around the shading opening.

7. The light fixture with motor-driven shaping of output light as claimed in claim 1, wherein the shading blades (3) are covered with a slide plate (7), and the shading blades (3) are sandwiched between the slide plate (7) and the blade holder (4), wherein the slide plate (7) is provided with a second aperture (72) in the middle and with a second guide groove (71) which is matched with the shape of the first guide groove (41), the slide plate (7) and blade holder (4) are fixedly connected in parallel, and the end of the transmission column (53) passes through the slide plate (7) so that it can be moved along the second guide groove (71).

8. The light fixture with motor-driven shaping of output light as claimed in claim 1, wherein the driving motors (5) are fixedly mounted on a motor holder (8), the blade holder (4) and the motor holder (8) are fixedly connected, a through hole (82) is formed in the middle of the motor holder (8), the light source assembly (2) is coaxially arranged with the first aperture (42) of the blade holder (4) and the light output end of the light source assembly (2) is fixedly mounted inside the through hole (82).

9. The light fixture with motor-driven shaping of output light as claimed in claim 1, further comprising a lens module (200), which is fixedly connected outside the light-shaping module (100) along the light output direction by a lens holder (15), comprising a lens barrel, wherein a face cover (12) is mounted at the end of the lamp housing (1) and the middle of the face cover (12) is provided with an opening for the lens barrel to pass through, and the lens holder (15) is accommodated in the lamp housing (1) after the face cover (12) and the lamp housing (1) are assembled.

10. The light fixture with motor-driven shaping of output light as claimed in claim 1, wherein the lamp housing (1) is provided with a signal receiving module for receiving a wireless control signal, and the signal receiving module is electrically connected to the driving board (6).

* * * * *